United States Patent [19]

Karatsu et al.

[11] Patent Number: 4,790,676

[45] Date of Patent: Dec. 13, 1988

[54] PRINTER RIBBON AND FILM USED FOR PREPARATION THEREOF

[75] Inventors: Makoto Karatsu; Sumio Goto, both of Ohita, Japan

[73] Assignee: Showa Denko Kabushiki Kaisha, Tokyo, Japan

[21] Appl. No.: 80,288

[22] Filed: Jul. 31, 1987

[30] Foreign Application Priority Data

Jul. 31, 1986 [JP] Japan .................................. 61-178942

[51] Int. Cl.$^4$ ............................................. B41J 31/00
[52] U.S. Cl. .................................. 400/241.1; 428/914; 525/240
[58] Field of Search ................... 400/241, 241.1, 241.4; 525/240; 526/352; 428/335, 913, 914

[56] References Cited

U.S. PATENT DOCUMENTS

| | | | |
|---|---|---|---|
| 2,219,700 | 10/1940 | Perrin et al. | 526/352.2 X |
| 2,539,303 | 1/1951 | Gerke et al. | 400/241 X |
| 2,631,954 | 3/1953 | Bright | 526/352.2 X |
| 2,830,689 | 4/1958 | Clancy et al. | 400/241.4 X |
| 2,865,903 | 12/1958 | Seed | 526/352.2 X |
| 2,930,788 | 3/1960 | Banks | 526/352 X |
| 2,983,704 | 5/1961 | Roedel | 525/240 |
| 3,083,410 | 4/1963 | McGlamery | 526/352.2 X |
| 3,088,848 | 5/1963 | Tritsch | 525/240 X |
| 3,179,719 | 4/1965 | Cines | 525/240 |
| 3,201,380 | 8/1965 | Schmidt-Thomee et al. | 526/352.2 X |
| 3,231,636 | 1/1966 | Snyder et al. | 525/240 |
| 3,317,504 | 5/1967 | Kinkel et al. | 526/352.2 X |
| 3,441,425 | 4/1969 | Richlin | 400/241.4 X |
| 3,503,843 | 3/1970 | Williams, Jr. et al. | 526/352.2 X |
| 3,752,291 | 8/1973 | Barouh et al. | 400/241.4 X |
| 3,847,888 | 11/1974 | Baumgaertner | 526/352.2 X |
| 3,979,357 | 9/1976 | Salyer et al. | 525/240 X |
| 3,998,914 | 12/1976 | Lillis et al. | 525/240 |
| 4,230,831 | 10/1980 | Sakurai et al. | 525/240 |
| 4,390,666 | 6/1983 | Moriguchi et al. | 525/240 X |
| 4,499,241 | 2/1985 | Yoshimura et al. | 525/240 X |
| 4,550,143 | 10/1985 | Tanaka et al. | 525/240 |
| 4,577,768 | 3/1986 | Go, deceased et al. | 525/240 |
| 4,623,567 | 11/1986 | Hert | 525/240 X |
| 4,705,829 | 11/1987 | Kwack et al. | 525/240 |
| 4,707,404 | 11/1987 | Morishita et al. | 428/335 |

FOREIGN PATENT DOCUMENTS

| | | | |
|---|---|---|---|
| 650334 | 10/1962 | Canada | 525/240 |
| 680514 | 2/1964 | Canada | 525/240 |
| 50-40053 | 12/1975 | Japan . | |
| 50-40054 | 12/1975 | Japan . | |
| 0048234 | 4/1980 | Japan | 525/240 |
| 0026051 | 2/1985 | Japan | 525/240 |
| 1057638 | 3/1986 | Japan | 525/240 |
| 860329 | 2/1961 | United Kingdom | 525/240 |
| 2148906 | 6/1985 | United Kingdom | 525/240 |

*Primary Examiner*—Ernest T. Wright, Jr.
*Attorney, Agent, or Firm*—Sughrue, Mion, Zinn, Macpeak & Seas

[57] ABSTRACT

Disclosed is a film for a printer ribbon, which is made of a resin composition comprising, 55 to 95% by weight of high-density polyethylene and 5 to 45% by weight of low-density polyethylene and having a melt tension of at least 1.4 g and a density of 0.94 to 0.96 g/cm$^3$. The film is made by the T-die-chill roll method wherein a good stability at both ends of the extruded molten resin film is maintained to prevent the occurrence of an uneven thickness or formation of wrinkles, and wherein undesirable engulfment of air between the molten resin film and the chill roll is avoided.

5 Claims, No Drawings

PRINTER RIBBON AND FILM USED FOR PREPARATION THEREOF

BACKGROUND OF THE INVENTION (1) Field of the Invention

The present invention relates to a printer ribbon and a film used for the preparation thereof. More particularly, it relates to a film used for the preparation of a printer ribbon, the demand for which is increasing with the recent development of typewriters, word processors and the like, and which film is prepared by the T-die-chill roll method.

(2) Description of the Related Art

As the substrate of a printer ribbon, there have been heretofore used fabrics of silk, cotton and nylon. These substrates have problems in that the printing characteristics are poor, the printing speed is low, the thickness is large, and the printing precision is low.

As the consumption of printer ribbons increases with the development of typewriters, word processors and the like, there is a strong demand for a reduction of the printing cost per word. Under these circumstances, use of a polyolefin film, for example, a high-density polyethylene film as the substrate of a printer ribbon has been recently attempted.

As a means for preparing these polyolefin films, there is known, for example, the T-die-chill roll method. The T-die-chill roll method is a film-preparing method in which a thermoplastic synthetic resin film extruded from a T-die is cooled by contact with a rotary chill roll, through the interior of which is ordinarily passed circulated cooling water.

According to this T-die-chill roll method, air is readily engulfed between the chill roll and the molten resin film, and because of an insufficient contact between the roll and the molten resin film, the film thickness is often uneven and wrinkles are readily formed on the film surface. Furthermore, since cooling is insufficient, the transparency or surface gloss is degraded. This tendency is conspicuous in the high-speed forming operation or the thin film-forming step, and if this film is used for a printer ribbon, problems such as a reduction of the printing characteristics, insufficient coating with an ink, and insufficient slitting arise.

SUMMARY OF THE INVENTION

It is a primary object of the present invention to provide a film for a printer ribbon, in which the occurrence of an uneven thickness or formation of wrinkles is prevented by maintaining a good stability at both ends of the extruded molten resin film in the T-die-chill roll method, and controlling the engulfment of air between the molten resin film and the chill roll and thus improving the contact between the molten resin film and the chill roll.

Another object of the present invention is to provide a film for a printer ribbon, which has excellent printing characteristics, ink-coating property and slitting property, by developing a highly melt-oriented film resulting from a high melt tension of the molten resin.

The above-mentioned objects of the present invention can be attained by a film for a printer ribbon, which is made from a resin composition comprising 55 to 95% by weight of high-density polyethylene and 5 to 45% by weight of low-density polyethylene and having a melt tension of at least 1.4 g and a density of 0.94 to 0.96 g/cm$^3$.

DESCRIPTION OF THE PREFERRED EMBODIMENTS

By the term "high density polyethylene", used herein, we mean not only a high density homopolymer of ethylene, but also a high density copolymer of at least 95% by weight of ethylene and not more than 5% by weight of an α-olefin having 3 to 8 carbon atoms. The high-density polyethylene is preferably selected from polypolyethylenes having a density of 0.94 to 0.97 g/cm$^3$ and a melt index of 2 to 10 g/10 min., and the low-density polyethylene is preferably selected from polyethylenes having a density of at least 0.916 g/cm$^3$ but less than 0.94 g/cm$^3$ and a melt index of 0.5 to 25 g/10 min. One low-density polyethylene or two or more of low-density polyethylenes may be used, and one high-density polyethylene or two or more of high-density polyethylenes may be used.

In the present invention, the melt tension of the resin composition is specified as at least 1.4 g because, if the melt tension is smaller than 1.4 g, both ends of the molten resin film become unstable and the contact with the chill roll is not constant along the entire width of the film, with the result that the thickness becomes uneven or wrinkles are formed and a good film for a printer ribbon cannot be obtained. Moreover, if the melt tension is smaller than 1.4 g, the melt orientation of the film is reduced and the slitting property is drastically degraded. The upper limit of the melt tension is not particularly critical, but if the melt tension is too large, the formability is degraded and breaking of the film readily occurs. Accordingly, preferably the melt tension is smaller than 3.5 g.

The density of the resin composition of the present invention is limited to 0.94 to 0.96 g/cm$^3$ because, if the density is lower than 0.94 g/cm$^3$, the slitting property is degraded, and if the density is higher than 0.96 g/cm$^3$, the printing characteristics of the film are degraded.

The amount of the low-density polyethylene incorporated is limited to 5 to 45% by weight based on the weight of the composition used in the present invention because, if the amount of the low-density polyethylene is smaller than 5% by weight, the intended effects of the present invention cannot be attained, and if the amount of the low-density polyethylene is larger than 45% by weight, the slitting property and printing characteristics of the film are degraded and the film cannot be used for a printer ribbon.

The melt index of the high-density polyethylene is preferably limited to 2 to 10 g/10 min. in the present invention because, if the melt index is smaller than 2 g/10 min., a sufficiently high forming speed cannot be attained, and if the melt index exceeds 10 g/10 min., the tensile strength of the film is drastically reduced and it is very difficult to use the film for a printer ribbon. The density of the high-density polyethylene is preferably limited to 0.94 to 0.97 g/cm$^3$ in the present invention because, if the density is outside this range, only a film having a poor slitting property and printing characteristics is obtainable.

The melt index and density of the low-density polyethylene are preferably limited to 0.5 to 25 g/10 min. and at least 0.916 g/cm$^3$ but less than 0.94 g/cm$^3$, respectively, because, if the melt index and density are outside these ranges, the amount of the low-density polyethylene to be blended with the high-density polyethylene is restricted and the desired melt tension cannot be obtained.

If there is a large difference in the melt index or density between high-density polyethylene and the low-density polyethylene, fish eyes are generally formed in the obtained film and good results cannot be obtained.

When the resin composition is applied to the T-die-chill roll method, a good stability is maintained at both ends of the molten resin film and a uniform contact is maintained between the molten resin film and the chill roll, and the uneven engulfment of air observed in the conventional techniques can be prevented.

Therefore, a good film having no thickness unevenness or no wrinkles formed on the surface can be obtained, and a highly melt-oriented film having an excellent stiffness, strength and slitting property can be obtained. Note, in the present invention, the thickness of the film is not particularly critical. However, in the case of a film for a printer ribbon, it is generally preferred that the thickness is 8 to 20 μm.

A printer ribbon can be made from the film of the present invention by coating the film with an ink. The coating may be carried out by a conventional procedure using a coater such as an air doctor coater, a reverse roll coater, a gravure coater, a rod coater, a roll doctor coater or a bead coater. The ink usually comprises a binder, an oily material, a pigment and a solvent. The binder includes, for example, a natural resin or its derivative such as rosin, a glycerin ester of rosin, a triethylene glycol ester of hydrated rosin, a pentaerythritol ester of modified rosin, a triethylene glycol ester of modified rosin, or a pentaerythritol ester of polymerized rosin; and a synthetic resin such as a polyamide, cellulose acetate butyrate, a polyester, an acrylic copolymer, a terpene resin, an α-pinene polymer, a terpene-phenol copolymer, a phenolic resin, a ketone resin, polyvinyl butyral, polyvinyl alcohol, chlorinated polypropylene, a styrene resin, an epoxy resin, polyurethane or a cellulose derivative. The pigment includes, for example, diazo yellow, Brilliant Carmine 6B, Lake Red C, Phthalocyanine Blue, carbon black, titanium oxide and calcium hydroxide. The oily material includes, for example, vegetable oil, process oil or mineral oil. The solvent includes, for example, an aromatic hydrocarbon such as toluene; an aliphatic hydrocarbon such as n-hexane; or an alcohol such as ethyl alcohol or isopropyl alcohol.

Examples and comparative examples will now be described. The methods used for testing resins and films in the examples are as follows.

Melt Tension (MT)

A melt tension tester (supplied by Toyo Seiki K.K.) was used, and 5 g of a sample was allowed to stand at a temperature of 190° C. for 5 minutes. Then the sample was extruded at an extrusion speed (piston speed) of 15 mm/min. from a nozzle having a diameter of 2.095 mm and a length of 8.0 mm, and the melt tension was measured at a take-up speed of 40 m/min.

Melt Index (MI)

The melt index was determined according to ASTM D-1238 under a load of 2.16 kg.

High-Load Melt Index (HLMI)

The high-load melt index was determined according to ASTM D-1238 under a load of 21.6 kg.

Density (ρ)

The density was determined according to ASTM D-1505.

Printing Characteristics

The clearness and defaced state of a typewritten word were checked with the naked eye and the printing characteristics were evaluated according to the following scale:

A (clear)>B>C (illegible)

Ink-Coating Property

Coating unevenness observed when a sample coated with an ink was checked with the naked eye and the ink-coated property was evaluated according to the following scale:

A (no unevenness)>B>C (conspicuous unevenness)

The ink used comprised 50 weight parts of a polyamide resin binder, 50 weight parts of a mineral oil, 20 weight parts of carbon black and 600 weight parts of a mixed solvent (toluene/isopropyl alcohol=3/7 by weight), and was prepared according to the known method disclosed in Japanese Examined Patent Publication No. 50-40053 or No. 50-40054. The ink was coated by gravure coating.

Slitting Property

The film coated with the ink was slit in a width of 8 mm and wound. At this operation, the end face of the ink ribbon (pan cake) was observed, and the slitting property was evaluated according to the following scale:

A (no dropping of ink)>B>C (notched end face)

The present invention will now be described in detail with reference to the following examples.

EXAMPLE 1

A film having a thickness of 14 μm was formed from a polyethylene resin composition comprising 70 parts by weight of high-density polyethylene (density=0.958 g/cm$^3$, MI=8 g/10 min., HLMI=230 g/10 HLMI/MI=28.8 and 30 parts by weight of low-density polyethylene (density 32 0.921 g/cm$^3$, MI=3 g/10 min., HLMI=140 g/10 min., HLMI/MI=46.7 according to the T-die-chill roll method (diameter of extruder=40 mm, die width=30 mm, lip distance=0.5 mm, T-die temperature=200° C., diameter of mirror-finished chill roll=300 mm). The results of the evaluation of the film are shown in Table 1.

EXAMPLE 2

A film having a thickness of 14 μm was formed from a polyethylene resin composition comprising 70 parts by weight of high-density polyethylene (density=0.958 g/cm$^3$, MI=5 g/10 min., HLMI=130 g/10 min., HLMI/MI=26, MT=0.4), 15 parts by weight of low-density polyethylene (density=0.923 g/cm$^3$, MI=1.5 g/10 min., HLMI=90 g/10 min., HLMI/MI=60) 15 parts by weight of another low-density polyethylene (density=0.924 g/cm$^3$, MI=20 g/10 min., HLMI=700 g/10 min., HLMI/MI=35) in the same m described in Example 1. The results of the evaluation are shown in Table 1.

EXAMPLE 3

A film having a thickness of 10 μm was formed from a polyethylene resin composition comprising 40 parts by weight of high-density polyethylene (density=0.95 g/cm$^3$, MI=10 g/10 min., HLMI=600 g/10 min., HLMI/MI=60), 40 parts by weight of another high-density polyethylene (density=0.958 g/cm$^3$, MI=5 g/10 min., HLMI=130 g/10 min., HLMI/MI=26) a 20 parts by weight of low-density polyethylene (density=0.923 g/cm$^3$, MI=1.5 g/10 min., HLMI=90 g/10 min., HLMI/MI=60) in the same manner as described in Example 1. The results of the evaluation are shown in Table 1.

COMPARATIVE EXAMPLE 1

A film having a thickness of 14 μm was formed from high-density polyethylene (density=0.95 g/cm$^3$, MI=7 g/10 min., HLMI=240 g/10 min., HLMI/MI==0.4 g) in the same manner as described in Example 1. The results of the evaluation are shown in Table 1.

COMPARATIVE EXAMPLE 2

A film having a thickness of 10 μm was formed from high-density polyethylene (density=0.949 g/cm$^3$, MI=6 g/10 min., HLMI=178 g/10 min., HLMI/MI=29.6, MT=1.0) in the same manner as described in Example 1. The results of the evaluation are shown in Table 1.

COMPARATIVE EXAMPLE 3

Only the same high-density polyethylene as used in Example 1 was formed into a film having a thickness of 14 μm under the same conditions as adopted in Example 1. The results of the evaluation are shown in Table 1.

COMPARATIVE EXAMPLE 4

A film having a thickness of 14 μm was formed under the same conditions as adopted in Example 1 except that the high-density polyethylene/low-density polyethylene mixing weight ratio was changed to 50/50. The results of the evaluation are shown in Table 1.

Since the film for a printer ribbon according to the present invention is made of a resin composition having a specific density and a high melt tension, which is obtained by incorporating a specific amount of low-density polyethylene with high-density polyethylene, when a film is prepared from this resin composition according to the T-die-chill roll method, the contact of both ends of the molten resin film with the chill roll can be kept uniform, and therefore, a uniform contact can be maintained between the molten resin film and the chill roll during the high-speed forming operation or during the film-forming operation and a film without unevenness of thickness or wrinkles can be obtained.

Furthermore, a highly melt-oriented film can be obtained. Therefore, according to the present invention, a film for a printing ribbon, which has excellent printing characteristics, ink-coating property, slitting property, and productivity can be provided.

What is claimed is:

1. A film for a printer ribbon, which is made of a resin composition comprising, 55 to 95% by weight of high-density polyethylene and 5 to 45% by weight of low-density polyethylene and having a melt tension of at least 1.4 g but smaller than 3.5 g and a density of 0.94 to 0.96 g/cm$^3$, said film having a thickness of 8 to 20 μm.

2. A film for a printer ribbon according to claim 1, wherein the high-density polyethylene has a melt index of 2 to 10 g/10 min. and a density of 0.94 to 0.97 g/cm$^3$ and the low-density polyethylene has a melt index of 0.5 to 25 g/10 min. and a density of at least 0.916 g/cm$^3$ but less than 0.94 g/cm$^3$.

3. A film for a printer ribbon according to claim 1, which is made by the T-die-chill roll method.

4. A printer ribbon comprising a substrate film and a printing ink coating formed on the film, said film being made of a resin composition comprising 55 to 95% by weight of high-density polyethylene and 5 to 45% by weight of low-density polyethylene and having a melt tension of at least 1.4 g but smaller than 3.5 g and a density of 0.94 to 0.96 g/cm$^3$, and said film having a thickness of 8 to 20 μm.

5. A printer ribbon according to claim 4, wherein the high-density polyethylene has a melt index of 2 to 10 g/10 min. and a density of 0.94 to 0.97 g/cm$^3$ and the low-density polyethylene has a melt index of 0.5 to 25 g/10 min. and a density of at least 0.916 g/cm$^3$ but less than 0.94 g/cm$^3$.

TABLE 1

| | High density polyethylene (HD) | | Low density polyethylene (LD) | | HD/LD Mixing ratio (% by weight) | MI/ρ | MT (g) 190° C. | Thickness (μm) | Printing characteristics | Ink-coating property | Slitting property |
|---|---|---|---|---|---|---|---|---|---|---|---|
| | ρ (g/cm$^3$) | MI (g/10 min.) | ρ (g/cm$^3$) | MI (g/10 min.) | | | | | | | |
| Example 1 | 0.958 | 8 | 0.921 | 3 | 70/30 | 4.6/0.947 | 1.4 | 14 | A | A | A |
| Example 2 | 0.958 | 5 | 0.923 0.924 | 1.5 20 | 70/15/15 | 5.2/0.948 | 1.6 | 14 | A | A | A |
| Example 3 | 0.950 0.958 | 10 5 | 0.923 | 1.5 | 40/40/20 | 4.6/0.948 | 2.7 | 10 | A | A | A |
| Comparative Example 1 | 0.950 | 7 | — | — | — | 7/0.950 | 0.4 | 14 | C | B | B |
| Comparative Example 2 | 0.949 | 6 | — | — | — | 6/0.949 | 1.0 | 10 | B-C | C | A-B |
| Comparative Example 3 | 0.958 | 8 | — | — | — | 8/0.958 | 0.4 | 14 | B-C | B-C | B-C |
| Comparative Example 4 | 0.958 | 8 | 0.921 | 3 | 50/50 | 4.9/0.940 | 3.0 | 14 | B | B | C |

* * * * *